United States Patent
Pedemonte

(10) Patent No.: US 10,985,424 B2
(45) Date of Patent: Apr. 20, 2021

(54) BATTERY COMPARTMENT COVER OF EQUIPMENT FOR UNDERWATER USE WITH CLOSURE DEVICE PROVIDED WITH EXTERNAL FASTENINGS

(71) Applicant: CRESSI-SUB S.p.A., Genoa (IT)

(72) Inventor: Stefano Pedemonte, Genoa (IT)

(73) Assignee: Cressi-Sub S.P.A., Genoa (IT)

( * ) Notice: Subject to any disclaimer, the term of this patent is extended or adjusted under 35 U.S.C. 154(b) by 97 days.

(21) Appl. No.: 16/294,125

(22) Filed: Mar. 6, 2019

(65) Prior Publication Data
US 2019/0288250 A1 Sep. 19, 2019

(30) Foreign Application Priority Data

Mar. 13, 2018 (IT) .................... IT102018000003473

(51) Int. Cl.
*B63C 11/02* (2006.01)
*H01M 50/216* (2021.01)
*H01M 50/20* (2021.01)

(52) U.S. Cl.
CPC .......... *H01M 50/216* (2021.01); *B63C 11/02* (2013.01); *H01M 50/20* (2021.01); *B63C 2011/021* (2013.01); *H01M 2220/30* (2013.01)

(58) Field of Classification Search
CPC .............. B63C 11/02; B63C 2011/021; H01M 50/216; H01M 50/20
USPC ........................................ 405/186
See application file for complete search history.

(56) References Cited

U.S. PATENT DOCUMENTS

| 3,828,611 | A * | 8/1974 | Shamlian | G04B 19/30 73/300 |
| 4,533,256 | A * | 8/1985 | Ostendorf | G04G 21/02 368/10 |
| 4,845,694 | A * | 7/1989 | Vuilleumier | G04B 37/11 368/309 |
| 5,103,685 | A * | 4/1992 | Wright | B63C 11/32 73/865.1 |
| 6,272,073 | B1 * | 8/2001 | Doucette | H04B 11/00 134/127 |
| 6,416,199 | B1 * | 7/2002 | Heine | B63C 11/12 351/158 |
| 6,754,137 | B1 * | 6/2004 | Bourquin | G04C 17/0091 368/10 |
| 7,874,722 | B2 * | 1/2011 | Clarkson | G04G 21/00 368/281 |
| 2001/0012577 | A1 | 8/2001 | Terasawa et al. | |
| 2003/0107218 | A1 | 6/2003 | Anderson et al. | |
| 2004/0120224 | A1 | 6/2004 | Meylan | |

(Continued)

FOREIGN PATENT DOCUMENTS

CN 102278603 12/2011
CN 204227070 3/2015

(Continued)

OTHER PUBLICATIONS

Search Report and Written Opinion for Application No. IT 201800003473, dated Jul. 5, 2018, 8 pages.

*Primary Examiner* — Frederick L Lagman
(74) *Attorney, Agent, or Firm* — Blank Rome LLP

(57) ABSTRACT

Equipment for underwater use with battery compartment cover provided with bayonet type connection system for fastening and unfastening the cover to/from the body of the equipment.

3 Claims, 1 Drawing Sheet

(56) References Cited

U.S. PATENT DOCUMENTS

| | | | | |
|---|---|---|---|---|
| 2004/0121226 A1* | 6/2004 | Kaelin | ................ | H01M 2/1044 |
| | | | | 429/96 |
| 2007/0277628 A1* | 12/2007 | Coleman | ................ | B63C 11/02 |
| | | | | 73/865.1 |
| 2010/0259875 A1* | 10/2010 | Yang | ................... | H04M 1/0262 |
| | | | | 361/679.01 |
| 2014/0128710 A1* | 5/2014 | Nakamura | ........... | A61B 5/6831 |
| | | | | 600/390 |
| 2018/0034016 A1* | 2/2018 | Kraehenbuehl | ..... | H01M 2/1044 |

FOREIGN PATENT DOCUMENTS

| | | | | |
|---|---|---|---|---|
| DE | 3222545 | 1/1983 | | |
| EP | 2853960 | 4/2015 | | |
| WO | WO-9406264 A1 * | 3/1994 | ............. | B63C 11/02 |
| WO | WO2013014599 | 1/2013 | | |

* cited by examiner

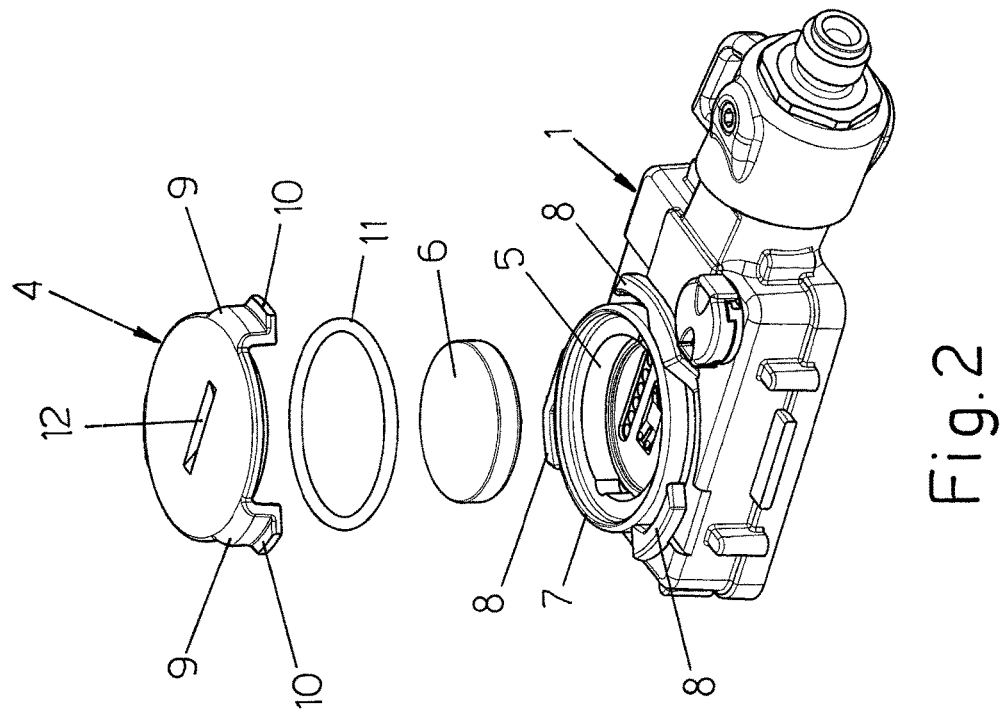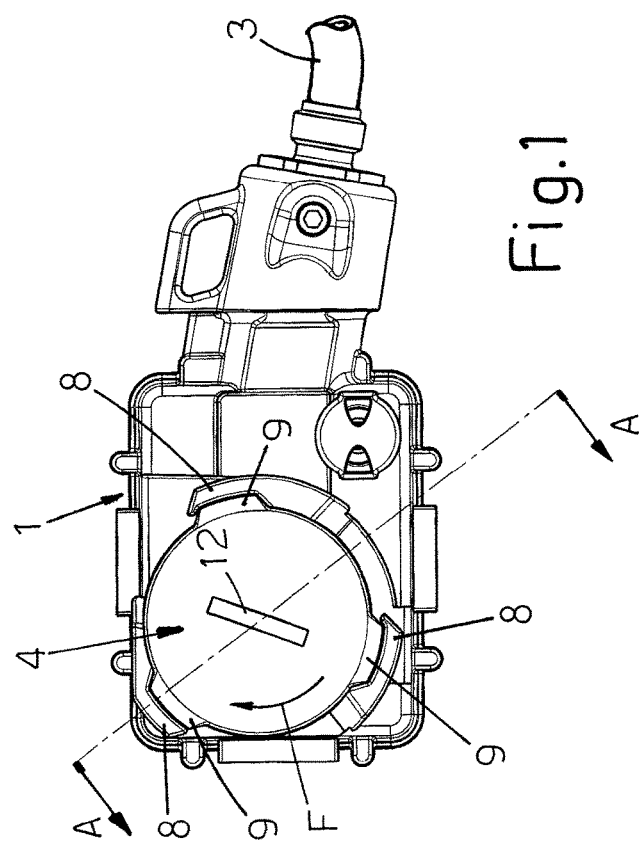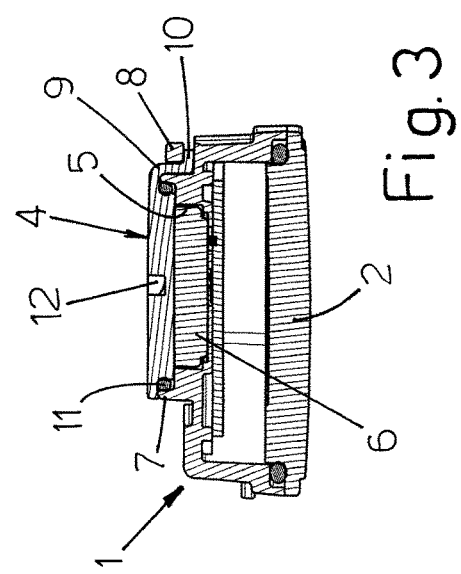

BATTERY COMPARTMENT COVER OF EQUIPMENT FOR UNDERWATER USE WITH CLOSURE DEVICE PROVIDED WITH EXTERNAL FASTENINGS

CROSS-REFERENCE TO RELATED APPLICATIONS

The present application claims priority to Italian Patent Application No. 102018000003473 filed on Mar. 13, 2018, the entirety of the disclosures of which are expressly incorporated herein by reference.

STATEMENT RE: FEDERALLY SPONSORED RESEARCH/DEVELOPMENT

Not Applicable

BACKGROUND

The present invention concerns equipment for underwater use, consisting of a container with sealed closure, housing on one side a display with relative electronic board, adapted to provide all the information essential for safe diving, and provided on the other side with a battery compartment with relative cover with sealed closure.

In these control panels the most delicate point is the access to the battery compartment, which on the one hand must guarantee a seal, but on the other must be easy to open in order to replace a flat battery, if possible without the use of special equipment which may not always be available to the diver.

For said purpose, multiple solutions have been designed, for example:

(a) Solutions provided with male-female thread. This system, although good, requires high-precision and complex work processes both in terms of moulds and, alternatively, second operation jobs. A further problem is frequent over-tightening by the user which makes it difficult to subsequently re-open the cover.

(b) Solutions provided with cover fixed to the body of the instrument by means of one or more screws. This solution increases the parts necessary, requires the use of threaded inserts, and very small screws and spanners which are not always available.

(c) Solutions with fastenings inside the battery compartment. These solutions do not require second operation jobs but on the other hand complicate the mould and reduce the space available for the battery, furthermore requiring a certain expertise to identify the area for insertion and subsequent fastening of the cover.

(d) Battery cover divided into two parts, one retaining the battery and the other retaining, like a ring nut, the assembly in the work position by means of fastenings outside the compartment. This solution multiplies the parts necessary and requires the use of tools for opening and closing the battery compartment.

BRIEF SUMMARY

The object of the present invention is to remedy the above-mentioned drawbacks of the known sealed closure systems of battery compartment covers of equipment for underwater use such as control panels, wrist computers and the like, providing said covers on the outside of the battery compartment with a bayonet type closure system. For said purpose an annular ridge is provided around the access to the battery compartment; from said ridge, a short distance from the bottom, angularly equispaced wing elements radially project, collaborating with analogous elements carried by the battery compartment cover.

To lock the cover, it is simply pushed in the direction of the battery compartment plane, and rotated by 90°.

Advantageously said bayonet connection system has two, and preferably three, connecting points. This solution solves all the problems and drawbacks of the known systems. The cover is composed of one single part which can be manipulated by simply using a coin. The battery is retained integrally in place before mounting the cover, and all the battery compartment space can be used for the battery and the battery contacts. Since the fastening points are external, they are fully visible, thus further simplifying the connection operation.

BRIEF DESCRIPTION OF THE DRAWINGS

Further objects and advantages of the present invention will become clear from the following description of an embodiment thereof, illustrated purely by way of example in the form of a control panel for underwater use, with reference to the accompanying drawing in which:

FIG. 1 is a plan view of a control panel produced according to the invention taken from the rear side thereof, illustrating the battery compartment cover in the closed position;

FIG. 2 is a perspective view of the control panel of FIG. 1, showing an exploded view of the battery compartment closure elements, and FIG. 3 is a cross section view of the control panel according to the invention taken along the plane of line A-A of FIG. 1.

DETAILED DESCRIPTION

With reference to the drawings, and with particular reference firstly to FIG. 1 thereof, the invention will be described referring to a control panel, but it is understood that the same can be applied to a wrist computer or to any other analogous device that requires a sealed closure. The underwater control panel illustrated comprises a watertight casing 1 bearing on the front side thereof a display 2 connected by means of the hose 3 to the diver's cylinders, so as to provide the diver with the necessary indications concerning the gas pressure in the cylinders, and all other information useful for safe diving. The control panel 1 has on its rear side a circular cover 4 which closes the compartment 5 housing the batteries 6 which power the electronic board for the display 2. The battery compartment 5 has a circular shape and is surrounded at its entrance by an annular ridge 7. From the outer side of this annular ridge 7 three angularly equidistant guiding and supporting elements 8 extend outwards and downwards. The closing cover 4 of the battery compartment has in turn three feet 9 angularly equispaced from one another, terminating in a radially outward protruding element 10. The cover 4 is further provided with an O-ring 11.

The operation of the closure device according to the invention is evident. To close the battery compartment 5 the cover 4 is applied on the annular ridge 7 with the feet 9 in the spaces between the elements 8. Said cover is then pressed down until the protruding wings 10 are positioned below the elements 8. At this point the cover 4 is rotated in the direction of the arrow F until the wings 10 engage with the bottom of the elements 8.

Due to the fact that said elements 8 are inclined downwards, they cause compression of the O-ring 11, thus guaranteeing a perfect seal of the battery compartment.

To open said compartment, the cover 4 is simply rotated in the opposite direction to the closing direction. To close and open the compartment, a coin is used, the edge of which is inserted in the notch 12 on the bottom of the cover 4.

Naturally the present invention is not limited to the embodiment illustrated and described. For example, there may be two (or any other number of) fastening and countering elements 8-10 instead of three. Also the shape of the control panel can be different, for example it can be cylindrical.

It is essential that the cover engages with the control panel by means of a bayonet fitting, with axial movement and subsequent rotation of the cover of said compartment.

What is claimed is:

1. Equipment for underwater use with a control display, the equipment comprising:
    a battery compartment; and
    a circular cover for closing the battery compartment,
    wherein an entrance of the battery compartment is surrounded by an annular ridge from which two or more angularly equispaced elements extend radially outwards, and
    wherein the cover is provided with feet angularly equispaced between one another, terminating in respective wings projecting radially outwards, the cover being furthermore provided on a bottom thereof with an O-ring adapted to cooperate with a crest of the annular ridge so that when the cover is applied on the annular ridge with the feet extending into spaces between the elements and when said cover is pushed down against the elastic action of the O-ring until the projecting wings are positioned below the elements, by rotating the cover the wings engage below the elements, thus locking the cover in the closed position.

2. The equipment according to claim 1, wherein said elements extend radially outwards and downwards from an intermediate area of the annular ridge.

3. The equipment according to claim 1 wherein there are three of said elements and three of said wings.

* * * * *